United States Patent [19]
Halasa et al.

[11] Patent Number: 6,043,321
[45] Date of Patent: Mar. 28, 2000

[54] ASYMMETRICAL TIN-COUPLED RUBBERY POLYMERS

[75] Inventors: Adel Farhan Halasa, Bath; Shingo Futamura, Wadsworth; Wen-Liang Hsu, Cuyahoga Falls; Barry Allen Matrana, Akron, all of Ohio

[73] Assignee: The Goodyear Tire & Rubber Company, Akron, Ohio

[21] Appl. No.: 09/008,716

[22] Filed: Jan. 19, 1998

[51] Int. Cl.[7] .............................. C08F 8/30; C08F 293/00; C08C 19/00; C08C 19/02
[52] U.S. Cl. .................. 525/333.1; 525/314; 525/332.5; 525/339
[58] Field of Search .................... 525/314, 99, 332.5, 525/236, 333.1; 526/340

[56] References Cited

U.S. PATENT DOCUMENTS

| | | | |
|---|---|---|---|
| 4,096,203 | 6/1978 | St. Clair | 260/876 B |
| 5,096,973 | 3/1992 | Hermann et al. | 525/314 |
| 5,162,409 | 11/1992 | Mroczkowski | 524/262 |
| 5,268,439 | 12/1993 | Hergenrother et al. | 526/340 |
| 5,486,573 | 1/1996 | Himes et al. | 525/314 |
| 5,514,757 | 5/1996 | Hsu et al. | 525/332.5 |
| 5,534,592 | 7/1996 | Halasa et al. | 525/236 |
| 5,541,264 | 7/1996 | Hsu et al. | 525/332.5 |
| 5,610,238 | 3/1997 | Himes et al. | 525/314 |
| 5,686,530 | 11/1997 | Halasa et al. | 525/99 |

FOREIGN PATENT DOCUMENTS 0314256   5/1989   European Pat. Off. .

*Primary Examiner*—David W. Wu
*Assistant Examiner*—Tanya Zalukaeva
*Attorney, Agent, or Firm*—Alvin T Rockhill

[57] ABSTRACT

Tire rubbers which are prepared by anionic polymerization are frequently coupled with a suitable coupling agent, such as a tin halide, to improve desired properties. It has been unexpectedly found that greatly improved properties for tire rubbers, such as lower hysteresis, can be attained by asymmetrically coupling the rubber. This invention more specifically discloses an asymmetrical tin-coupled rubbery polymer which is particularly valuable for use in manufacturing tire tread compounds, said asymmetrical tin-coupled rubbery polymer being comprised of a tin atom having at least three polydiene arms covalently bonded thereto, wherein at least one of said polydiene arms has a number average molecular weight of less than about 40,000, wherein at least one of said polydiene arms has a number average molecular weight of at least about 80,000, and wherein the ratio of the weight average molecular weight to the number average molecular weight of the asymmetrical tin-coupled rubbery polymer is within the range of about 2 to about 2.5.

11 Claims, No Drawings

ASYMMETRICAL TIN-COUPLED RUBBERY POLYMERS

BACKGROUND OF THE INVENTION

Tin-coupled polymers are known to provide desirable properties, such as improved treadwear and reduced rolling resistance, when used in tire tread rubbers. Such tin-coupled rubbery polymers are typically made by coupling the rubbery polymer with a tin coupling agent at or near the end of the polymerization used in synthesizing the rubbery polymer. In the coupling process, live polymer chain ends react with the tin coupling agent thereby coupling the polymer. For instance, up to four live chain ends can react with tin tetrahalides, such as tin tetrachloride, thereby coupling the polymer chains together.

The coupling efficiency of the tin coupling agent is dependant on many factors, such as the quantity of live chain ends available for coupling and the quantity and type of polar modifier, if any, employed in the polymerization. For instance, tin coupling agents are generally not as effective in the presence of polar modifiers. The amount of coupling which is attained is also, of course, highly dependent upon the quantity of tin coupling agent employed.

Each tin tetrahalide molecule is capable of reacting with up to four live polymer chain ends. However, since perfect stoichiometry is difficult to attain, some of the tin halide molecules often react with less than four live polymer chain ends. For instance, if more than a stoichiometric amount of the tin halide coupling agent is employed, then there will be an insufficient quantity of live polymer chain ends to totally react with the tin halide molecules on a four to one basis. On the other hand, if less than a stoichiometric amount of the tin halide coupling agent is added, then there will be an excess of live polymer chain ends and some of the live chain ends will not be coupled.

Conventional tin coupling results in the formation of a coupled polymer which is essentially symmetrical. In other words, all of the polymer arms on the coupled polymer are of essentially the same chain length. All of the polymer arms in such conventional tin-coupled polymers are accordingly of essentially the same molecular weight. This results in such conventional tin-coupled polymers having a low polydispersity. For instance, conventional tin-coupled polymers normally having a ratio of weight average molecular weight to number average molecular weight which is within the range of about 1.01 to about 1.1

SUMMARY OF THE INVENTION

This invention is based upon the unexpected finding that greatly improved properties for tire rubbers, such as lower hysteresis, can be attained by asymmetrically coupling the rubber. For instance, such asymmetrically coupled polymers can be utilized in making tires having greatly improved rolling resistance without sacrificing other tire properties. These improved properties are due in part to better interaction and compatibility with carbon black. The asymmetrical tin coupling also normally leads to improve the cold flow characteristics of the rubbery polymer. Tin coupling in general also leads to better processability and other beneficial properties.

The asymmetrical tin-coupled rubbery polymers of this invention are comprised of a tin atom having polydiene arms covalently bonded thereto. At least one of the polydiene arms bonded to the tin atom will be a low number molecular weight arm having a number average molecular weight of less than about 40,000. It is also critical for the asymmetrical tin-coupled rubbery polymer to have at least one high molecular weight polydiene arm bonded to the tin atom. This high molecular weight arm will have a number average molecular weight which is at least 80,000. The ratio of the weight average molecular weight to the number average molecular weight of the asymmetrical tin-coupled rubbery polymers of this invention will also be within the range of about 2 to about 2.5.

This invention more specifically discloses an asymmetrical tin-coupled rubbery polymer which is particularly valuable for use in manufacturing tire tread compounds, said asymmetrical tin-coupled rubbery polymer being comprised of a tin atom having at least three polydiene arms covalently bonded thereto, wherein at least one of said polydiene arms has a number average molecular weight of less than about 40,000, wherein at least one of said polydiene arms has a number average molecular weight of at least about 80,000, and wherein the ratio of the weight average molecular weight to the number average molecular weight of the asymmetrical tin-coupled rubbery polymer is within the range of about 2 to about 2.5.

This invention also reveals a process for preparing an asymmetrical tin-coupled rubbery polymer which comprises: (1) continuously polymerizing at least one diene monomer to a conversion of at least about 90 percent utilizing an anionic initiator to produce a polymer cement containing living polydiene rubber chains, wherein some of the living polydiene rubber chains are low molecular weight polydiene rubber chains having a number average molecular weight of less than about 40,000, and wherein some of the living polydiene rubber chains are high molecular weight polydiene rubber chains having a number average molecular weight of greater than about 80,000; and (2) continuously adding a tin halide to the polymer cement in a separate reaction vessel to produce the asymmetrically tin-coupled rubbery polymer, wherein said asymmetrical tin-coupled rubbery polymer has a polydispersity which is within the range of about 2 to about 2.5.

The stability of the asymmetrical tin-coupled rubbery polymers of this invention can be improved by adding a tertiary chelating amine thereto subsequent to the time at which the tin-coupled rubbery polymer is coupled. N,N,N', N'-tetramethylethylenediamine (TMEDA) is a representative example of a tertiary chelating amine which is preferred for utilization in stabilizing the polymers of this invention.

DETAILED DESCRIPTION OF THE INVENTION

Virtually any type of rubbery polymer prepared by anionic polymerization can be asymmetrically tin-coupled in accordance with this invention. The rubbery polymers which can be asymmetrically coupled will typically be synthesized by a solution polymerization technique utilizing an organolithium compound as the initiator. These rubbery polymers will accordingly normally contain a "living" lithium chain end.

The polymerizations employed in synthesizing the living rubbery polymers will normally be carried out in a hydrocarbon solvent which can be one or more aromatic, paraffinic or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerization, there will normally be from 5 to 30 weight percent monomers in the polymerization medium. Such polymerization media are, of course, comprised of the organic solvent and monomers. In most cases, it will be preferred for the polymerization medium to contain from 10 to 25 weight percent monomers. It is generally more preferred for the polymerization medium to contain 15 to 20 weight percent monomers.

The rubbery polymers which are asymmetrically coupled in accordance with this invention can be made by the homopolymerization of a conjugated diolefin monomer or by the copolymerization of a conjugated diolefin monomer with a vinyl aromatic monomer. It is, of course, also possible to make living rubbery polymers which can be asymmetrically tin-coupled by polymerizing a mixture of conjugated diolefin monomers with one or more ethylenically unsaturated monomers, such as vinyl aromatic monomers. The conjugated diolefin monomers which can be utilized in the synthesis of rubbery polymers which can be asymmetrically tin-coupled in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be synthesized into rubbery polymers which can be asymmetrically tin-coupled in accordance with this invention include alkyl acrylates, such as methyl acrylate, ethyl acrylate, butyl acrylate, methyl methacrylate and the like; vinylidene monomers having one or more terminal CH2=CH— groups; vinyl aromatics such as styrene, α-methylstyrene, bromostyrene, chlorostyrene, fluorostyrene and the like; α-olefins such as ethylene, propylene, 1-butene and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers which are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

Some representative examples of rubbery polymers which can be asymmetrically tin-coupled in accordance with this invention include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber.

The polymerizations employed in making the rubbery polymer are typically initiated by adding an organolithium initiator to an organic polymerization medium which contains the monomers. Such polymerizations are typically carried out utilizing continuous polymerization techniques. In such continuous polymerizations, monomers and initiator are continuously added to the organic polymerization medium with the rubbery polymer synthesized being continuously withdrawn. Such continuous polymerizations are typically conducted in a multiple reactor system.

The organolithium initiators which can be employed in synthesizing rubbery polymers which can be asymmetrically coupled in accordance with this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the monomers being polymerized and with the molecular weight that is desired for the polymer being synthesized. However, as a general rule, from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane and the like.

Exemplary multivinylphosphine compounds include trivinylphosphine, methyldivinylphosphine, dodecyldivinylphosphine, phenyldivinylphosphine, cyclooctyldivinylphosphine and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene and the like. Divinyl aromatic hydrocarbons containing up to 18 carbon atoms per molecule are preferred, particularly divinylbenzene as either the ortho, meta or para isomer and commercial divinylbenzene, which is a mixture of the three isomers, and other compounds, such as the ethylstyrenes, also is quite satisfactory.

Other types of multifunctional initiators can be employed such as those prepared by contacting a sec- or tert-organomonolithium compound with 1,3-butadiene, at a ratio of about 2 to 4 moles of the organomonolithium compound per mole of the 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by R(Li)x wherein R represents a hydrocarbyl radical containing from 1 to 20 carbon atoms, and wherein x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,41-dilithiobiphenyl and the like.

The polymerization temperature utilized can vary over a broad range of from about −20° C. to about 180° C. In most cases, a temperature within the range of about 30° C to about 125° C. will be utilized. It is typically most preferred for the polymerization temperature to be within the range of about 60° C. to about 85° C. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization is then terminated by the continuous addition of a tin coupling agent. This continuous addition of tin coupling agent is normally done in a reaction zone separate from the zone where the bulk of the polymerization is occurring. In other words, the tin coupling agent will typically be added only after a high degree of conversion has already been attained. For instance, the tin coupling agent will normally be added only after a monomer conversion of greater than about 90 percent has been realized. It will typically be preferred for the monomer conversion to reach at least about 95 percent before the tin coupling agent is added. As a general rule, it is most preferred for the monomer conversion to exceed about 98 percent before the tin coupling agent is added. The tin coupling agent will normally be added in a separate reaction vessel after the desired degree of conversion has been attained. The tin coupling agent can be added in a hydrocarbon solution, e.g., in cyclohexane, to the polymerization admixture with suitable mixing for distribution and reaction.

The tin coupling agent will normally be a tin tetrahalide, such as tin tetrachloride, tin tetrabromide, tin tetrafluoride or tin tetraiodide. However, tin trihalides can also optionally be used. In cases where tin trihalides are utilized, a coupled polymer having a maximum of three arms results. To induce a higher level of branching, tin tetrahalides are normally preferred. As a general rule, tin tetrachloride is most preferred.

Broadly, and exemplary, a range of about 0.01 to 4.5 milliequivalents of tin coupling agent is employed per 100 grams of the rubbery polymer. It is normally preferred to utilize about 0.01 to about 1.5 milliequivalents of the tin coupling agent per 100 grams of polymer to obtain the desired Mooney viscosity. The larger quantities tend to result in production of polymers containing terminally reactive groups or insufficient coupling. One equivalent of tin coupling agent per equivalent of lithium is considered an optimum amount for maximum branching. For instance, if a tin tetrahalide is used as the coupling agent, one mole of the tin tetrahalide would be utilized per four moles of live lithium ends. In cases where a tin trihalide is used as the coupling agent, one mole of the tin trihalide will optimally be utilized for every three moles of live lithium ends. The tin coupling agent can be added in a hydrocarbon solution, e.g., in cyclohexane, to the polymerization admixture in the reactor with suitable mixing for distribution and reaction.

After the tin coupling has been completed, a tertiary chelating alkyl 1,2-ethylene diamine can optionally be added to the polymer cement to stabilize the asymmetrically tin-coupled rubbery polymer. The tertiary chelating amines which can be used are normally chelating alkyl diamines of the structural formula:

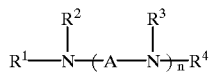

wherein n represents an integer from 1 to about 6, wherein A represents an alkylene group containing from 1 to about 6 carbon atoms and wherein $R^1$, $R^2$, $R^3$ and $R^4$ can be the same or different and represent alkyl groups containing from 1 to about 6 carbon atoms. The alkylene group A is the formula $-(-CH_2-)_m$ wherein m is an integer from 1 to about 6. The alkylene group will typically contain from 1 to 4 carbon atoms (m will be 1 to 4) and will preferably contain 2 carbon atoms. In most cases, n will be an integer from 1 to about 3 with it being preferred for n to be 1. It is preferred for $R^1$, $R^2$, $R^3$ and $R^4$ to represent alkyl groups which contain from 1 to 3 carbon atoms. In most cases, $R^1$, $R^2$, $R^3$ and $R^4$ will represent methyl groups.

A sufficient amount of the chelating amine should be added to complex with any residual tin coupling agent remaining after completion of the coupling reaction.

In most cases, from about 0.01 phr (parts by weight per 100 parts by weight of dry rubber) to about 2 phr of the chelating alkyl 1,2-ethylene diamine will be added to the polymer cement to stabilize the rubbery polymer. Typically, from about 0.05 phr to about 1 phr of the chelating alkyl 1,2-ethylene diamine will be added. More typically, from about 0.1 phr to about 0.6 phr of the chelating alkyl 1,2-ethylene diamine will be added to the polymer cement to stabilize the rubbery polymer.

After the polymerization, asymmetrical tin coupling, and optionally the stabilization step, has been completed, the asymmetrical tin-coupled rubbery polymer can be recovered from the organic solvent. The asymmetrical tin-coupled rubbery polymer can be recovered from the organic solvent and residue by means such as decantation, filtration, centrification and the like. It is often desirable to precipitate the asymmetrically tin-coupled rubbery polymer from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the asymmetrically tin-coupled rubbery polymer from the polymer cement also "kills" any remaining living polymer by inactivating lithium end groups. After the asymmetrically tin-coupled rubbery polymer is recovered from the solution, steam-stripping can be employed to reduce the level of volatile organic compounds in the asymmetrically tin-coupled rubbery polymer.

The asymmetrical tin-coupled rubbery polymers of this invention are comprised of a tin atom having at least three polydiene arms covalently bonded thereto. At least one of the polydiene arms bonded to the tin atom has a number average molecular weight of less than about 40,000 and at least one of the polydiene arms bonded to the tin atom has a number average molecular weight of at least about 80,000. The ratio of the weight average molecular weight to the number average molecular weight of the asymmetrical tin-coupled rubbery polymer will also be within the range of about 2 to about 2.5.

The asymmetrical tin-coupled rubbery polymers of this invention are of the structural formula:

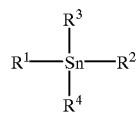

wherein $R^1$, $R^2$, $R^3$ and $R^4$ can be the same or different and are selected from the group consisting of alkyl groups and polydiene arms (polydiene rubber chains), with the proviso that at least three members selected from the group consisting of $R^1$, $R^2$, $R^3$ and $R^4$ are polydiene arms, with the proviso that at least one member selected from the group consisting of $R^1$, $R^2$, $R^3$ and $R^4$ is a low molecular weight polydiene arm having a number average molecular weight of less than about 40,000, with the proviso that at least one member selected from the group consisting of $R^1$, $R^2$, $R^3$ and $R^4$ is a high molecular weight polydiene arm having a number average molecular weight of greater than about 80,000, and with the proviso that the ratio of the weight average molecular weight to the number average molecular weight of the asymmetrical tin-coupled rubbery polymer is within the range of about 2 to about 2.5. It should be noted that $R^1$, $R^2$, $R^3$ and $R^4$ can be alkyl groups because it is possible for the tin halide coupling agent to react directly with alkyl lithium compounds which are used as the polymerization initiator.

In most cases, four polydiene arms will be covalently bonded to the tin atom in the asymmetrical tin-coupled rubbery polymer. In such cases, $R^1$, $R^2$, $R^3$ and $R^4$ will all be polydiene arms. The asymmetrical tin-coupled rubbery polymer will often contain a polydiene arm of intermediate molecular weight as well as the low molecular weight arm and the high molecular weight arm. Such intermediate molecular weight arms will have a molecular weight which is within the range of about 45,000 to about 75,000. It is normally preferred for the low molecular polydiene arm to have a molecular weight of less than about 30,000 with it being most preferred for the low molecular weight arm to have a molecular weight of less than about 25,000. It is normally preferred for the high molecular polydiene arm to have a molecular weight of greater than about 90,000 with it being most preferred for the high molecular weight arm to have a molecular weight of greater than about 100,000.

This invention is illustrated by the following examples which are merely for the purpose of illustration and are not to be regarded as limiting the scope of the invention or the manner in which it can be practiced. Unless specifically indicated otherwise, parts and percentages are given by weight.

Benefits with tin-coupled IBRs, as compared to the linear IBRs, are demonstrated by the following examples. These benefits include:

(1) Improvements in processability, particularly extrudability/extrudate quality.
(2) Treadwear improvement and rolling resistance reduction due to improved carbon black dispersion with the tin-coupled IBR. Good dispersion of carbon black prevents carbon particles from forming a network of carbon black in the vulcanizate and reduces hysteresis resulting from carbon black aggregates. This is known as Payne effect. The higher the Payne effect, the better the carbon black dispersion. The Payne effect can be measured as follows:

$$\text{Payne effect} = \frac{G' \text{ at } 10\% \text{ strain}}{G' \text{ at } 1\% \text{ strain}} \times 100$$

EXAMPLE 1

In this example, a coupled isoprene-butadiene rubber (IBR) was prepared in a one-gallon (3.8 liters) batch reactor at 70° C. In the procedure used, 2,000 grams of a silica/molecular sieve/aluminum dried premix containing 19.0 weight percent of a mixture of isoprene and 1,3-butadiene in hexanes at the ratio of 10:90 was charged into a one-gallon (3.8 liters) reactor. After the amount of impurity in the premix was determined, 4.0 ml of a 1.0M solution of n-butyl lithium (in hexane) was added to the reactor. The target Mn (number averaged molecular weight) was 100,000. The polymerization was allowed to proceed at 70° C. for three hours. An analysis of the residual monomer indicated that monomers was all consumed. Then, 1.0 ml of a 1M solution of tin tetrachloride (in hexane) was added to the reactor and the coupling reaction was carried out at the same temperature for 30 minutes. At this time, 1.5 phr (parts per 100 parts by weight of rubber) of 4-t-butylcatechol and 0.5 phr of TMEDA was added to the reactor to shortstop the polymerization and to stabilize the polymer.

After the hexane solvent was evaporated, the resulting SIBR was dried in a vacuum oven at 50° C. The coupled IBR was determined to have a glass transition temperature (Tg) at −95° C. It was also determined to have a microstructure which contained 7 percent 1,2-polybutadiene units, 87 percent 1,4-polybutadiene units, 1 percent 3,4-polyisoprene units and 9 percent 1,4-polyisoprene units. The Mooney viscosity (ML-4) of the coupled IBR made was determined to be 99.

EXAMPLES 2–4

The procedure described in Example 1 was utilized in these examples except that the isoprene to 1,3-butadiene ratio were changed from 10:90 to 15:85, 20:80 and 30:70. The Tgs, Mooney viscosities (ML-4) and microstructures of these tin-coupled IBRs are listed in Table I. The 30/70 IBR (Example 4) was determined to have an Mn (number averaged molecular weight) of 386,000 and a Mw (weight averaged molecular weight) of 430,000. The precursor of Example 4 (ie, base polymer prior to coupling) was also determined to have an Mn of 99,000 and an Mw of 112,000.

TABLE I

| Ex. | Isoprene/Bd Composition | Tg (° C.) | ML-4 | Microstructure (%) | | | |
|---|---|---|---|---|---|---|---|
| | | | | 1,2-PBd | 1,4-PBd | 3,4-PI | 1,4-PI |
| 1 | 10/90 | −95 | 99 | 7 | 83 | 2 | 8 |
| 2 | 15/85 | −93 | 91 | 8 | 77 | 1 | 14 |
| 3 | 20/80 | −90 | 82 | 8 | 72 | 1 | 19 |
| 4 | 30/70 | −87 | 84 | 7 | 63 | 3 | 27 |

EXAMPLES 5–8

In these examples, linear IBRs were prepared in a one-gallon reactor. The procedure described in Example 1 was utilized in these examples except that no coupling agent (tin tetrachloride) was used in these experiments and the target Mn was changed to 300,000 from 100,000. The isoprene to 1,3-butadiene ratios were 10:90, 15:85, 20:80 and 30:70. The Tgs, Mooney viscosities (ML-4), Mns (number averaged molecular weights), Mws (weight averaged molecular weights) and microstructures of these linear IBRs are listed in Table II.

TABLE II

| Ex. | Isoprene/Bd Composition | Tg (° C,) | ML-4 | Mn | Mw | Microstructure (%) | | | |
|---|---|---|---|---|---|---|---|---|---|
| | | | | | | 1,2-PBd | 1,4-PBd | 3,4-PI | 1,4-PI |
| 5 | 10/90 | −96 | 88 | 308K | 326K | 7 | 83 | 1 | 9 |
| 6 | 15/85 | −94 | 81 | 307K | 329K | 7 | 77 | 1 | 15 |
| 7 | 20/80 | −92 | 82 | 317K | 338K | 7 | 72 | 1 | 20 |
| 8 | 30/70 | −89 | 87 | 313K | 332K | 6 | 62 | 2 | 30 |

EXAMPLE 9

The tin-coupled IBR prepared in this experiment was synthesized in a three-reactor (10 gallons each) continuous system at 90° C. A premix containing isoprene and 1,3-butadiene in hexane was charged into the first reactor continuously at a rate of 65.6 grams/minute. The premix monomer solution containing a ratio of isoprene to 1,3-butadiene of 30:70 and had a total monomer concentration of 14 percent. Polymerization was initiated by adding 0.128M solution of n-butyl lithium into the first reactor at a rate of 0.4 grams per minute. Most of the monomers were exhausted at the end of the second reactor and the resulted polymerization medium containing the live ends was continuously pushed into the third reactor where the coupling agent, tin tetrachloride, (0.025M solution in hexane) was added at a rate of 0.34 grams per minute. The residence time for all three reactors was set at 1.5 hours to achieve complete monomer conversion in the second reactor and complete coupling in the third reactor. The polymerization medium was then continuously pushed over to a holding tank containing the TMEDA and an antioxidant. The resulting polymer cement was then steam-stripped and the recovered IBR was dried in an oven at 60° C. The polymer was determined to have a glass transition temperature at −85° C. and have a Mooney ML-4 viscosity of 90. It was also determined to have a microstructure which contained 8 percent 1,2-polybutadiene units, 60 percent 1,4-polybutadiene units, 29 percent 1,4-polyisoprene units and 3 percent 3,4-polyisoprene units. The polymer was determined to have a Mn (number averaged molecular weight) of 185,000 and a Mw (weight averaged molecular weight) of 276,000. The precursor of this polymer (i.e., base polymer prior to coupling) was also determined to have an Mn of 88,000 and an Mw of 151,000.

Unlike the Example 4 (prepared and coupled in a batch process) which showed a symmetrical coupling of four linear precursor polymers, the polymer produced in this example via the continuous process had unsymmetrical coupling base on GPC molecular data shown above.

EXAMPLES 10–12

The isoprene-butadiene rubbers made in Example 4, 8 and 9 were then compounded utilizing a standard tire tread test formulation. The tire tread test formulations were made by mixing 100 parts of rubber being tested with 50 parts of carbon black, 5 parts of processing oil, 2 parts of stearic acid, 3 parts of zinc oxide, 1 part of microcrystalline wax, 0.5 part of paraffin wax, 1 part of a mixed aryl-p-phenylenediamine antioxidant, 2 parts of N-(1,3-dimethyl butyl)-N'-phenyl-p-phenylene diene and 1.4 parts of sulfur. The physical properties of the compounded tire tread formulations are reported in Table III.

TABLE III

| Example | 8 | 4 | 9 |
|---|---|---|---|
| Rubber Type | Linear | Batch coupled | continuous coupled |
| Rheometer, 150° C. | | | |
| ML, dNm | 1.21 | 1.49 | 1.67 |
| MH, dNm | 24.06 | 25.71 | 23.71 |
| ts1, min | 4.06 | 4.86 | 5.39 |
| T25, min | 5.62 | 5.78 | 6.50 |
| T90, min | 10.36 | 9.71 | 9.88 |
| Autovibron, 11 Hz | | | |
| tan delta at 60° C. | 0.113 | 0.083 | 0.072 |
| G' at 10% | 2.494 | 2.294 | 2.195 |
| G° at 1% | 3.435 | 2.732 | 2.566 |
| Payne effect | 72.6 | 84.4 | 85.5 |

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An asymmetrical tin-coupled rubbery polymer tire tread compounds, said asymmetrical tin-coupled rubbery polymer being comprised of a tin atom having at least three polydiene arms covalently bonded thereto, wherein at least one of said polydiene arms has a molecular weight of less than about 40,000, wherein at least one of said polydiene arms has a molecular weight of at least about 80,000, wherein the polydiene arms are selected from the group consisting of isoprene-butadiene chains, isoprene chains, and butadiene chains, and wherein the ratio of the weight average molecular weight to the number average molecular weight of the asymmetrical tin-coupled rubbery polymer is within the range of about 2 to about 2.5.

2. An asymmetrical tin-coupled rubbery polymer as specified in claim 1 wherein 4 polydiene arms are covalently bonded to the tin atom.

3. An asymmetrical tin-coupled rubbery polymer as specified in claim 2 wherein at least one of the polydiene arms covalently bonded to the tin atom is of an intermediate number average molecular weight which is within the range of about 45,000 to about 75,000.

4. An asymmetrical tin-coupled rubbery polymer as specified in claim 3 wherein at least one of the polydiene arms covalently bonded to the tin atom has a number average molecular weight of less than about 30,000.

5. An asymmetrical tin-coupled rubbery polymer as specified in claim 4 wherein at least one of the polydiene arms covalently bonded to the tin atom has a number average molecular weight of greater than about 90,000.

6. An asymmetrical tin-coupled rubbery polymer as specified in claim 5 wherein at least one of the polydiene arms covalently bonded to the tin atom has a number average molecular weight of less than about 25,000.

7. An asymmetrical tin-coupled rubbery polymer as specified in claim 6 wherein at least one of the polydiene arms covalently bonded to the tin atom has a number average molecular weight of greater than about 100,000.

8. An asymmetrical tin-coupled rubbery polymer as specified in claim 6 wherein said polydiene arms are isoprene-butadiene chains.

9. An asymmetrical tin-coupled rubbery polymer as specified in claim 6 wherein said polydiene arms are isoprene chains.

10. An asymmetrical tin-coupled rubbery polymer as specified in claim 6 wherein said polydiene arms are butadiene chains.

11. An asymmetrical tin-coupled rubbery polymer as specified in claim 6 wherein said polydiene arms are isoprene-butadiene chains.

* * * * *